United States Patent
Tsuruhara

(10) Patent No.: US 6,169,344 B1
(45) Date of Patent: Jan. 2, 2001

(54) ALTERNATING CURRENT GENERATOR FOR VEHICLE

(75) Inventor: Kenji Tsuruhara, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/388,370

(22) Filed: Sep. 1, 1999

(30) Foreign Application Priority Data

Feb. 23, 1999 (JP) .................................................. 11-045453

(51) Int. Cl.$^7$ ...................................................... H02K 9/00
(52) U.S. Cl. ......................... 310/58; 310/89; 237/12.3 R
(58) Field of Search ................. 310/54, 58, 62, 310/64, 89; 29/596; 237/12.3 R

(56) References Cited

U.S. PATENT DOCUMENTS

| | | | |
|---|---|---|---|
| 4,221,982 | * 9/1980 | Raver et al. ............................ | 310/59 |
| 4,739,204 | * 4/1988 | Kitamura et al. ................... | 310/68 D |
| 4,922,148 | * 5/1990 | Gahle et al. .......................... | 327/262 |
| 4,963,776 | * 10/1990 | Kitamura .............................. | 310/64 |
| 4,980,588 | * 12/1990 | Ogawa .............................. | 310/68 D |
| 5,019,733 | * 5/1991 | Kano et al. ............................. | 310/61 |
| 5,095,235 | * 3/1992 | Kitamura ........................... | 310/68 D |
| 5,293,089 | * 3/1994 | Frister ..................................... | 310/54 |
| 5,296,770 | * 3/1994 | Pflueger et al. .................... | 310/114 |
| 5,798,586 | * 8/1998 | Adachi .................................. | 310/54 |
| 5,836,270 | * 11/1998 | Aoki et al. ......................... | 123/41.31 |
| 5,952,751 | * 9/1999 | Yamakoshi et al. ................... | 310/89 |
| 5,971,291 | * 10/1999 | Moroi et al. ..................... | 237/12.3 R |

FOREIGN PATENT DOCUMENTS

| | | | |
|---|---|---|---|
| 196 30 658 A1 | * 5/1998 | (DE) . | |
| 2711281 A1 | * 10/1993 | (FR) . | |
| 4-67429 | 10/1992 | (JP) . | |
| 07163090 | * 6/1995 | (JP) . | |
| 04004736 | * 1/1999 | (JP) . | |

* cited by examiner

*Primary Examiner*—Nestor Ramirez
*Assistant Examiner*—Joseph Waks
(74) *Attorney, Agent, or Firm*—Sughrue, Mion, Zinn, Macpeak & Seas, PLLC

(57) ABSTRACT

An alternating current generator has a cooling function for a vehicle and includes a front bracket and a rear bracket with annular recessed portions that form a peripheral cooling chamber. A cooling cover is provided on the rear bracket. The cooling cover and the rear bracket form a rear cooling chamber. The peripheral cooling chamber and the rear cooling chamber are connected together through a connecting hole provided in the rear bracket. The front and rear brackets also form a parts housing chamber for receiving electric parts. The parts housing chamber is isolated from the peripheral and rear cooling chambers so as not to accommodate the fluid.

19 Claims, 5 Drawing Sheets

ALTERNATING CURRENT GENERATOR FOR VEHICLE

BACKGROUND OF THE INVENTION

1. Field of the Invention

This invention relates to an alternating current generator for a use of vehicle having a cooling function by means of a coolant.

2. Description of the Prior Art

FIG. 5 shows a sectional view of an alternating current generator for a vehicle disclosed by the Japanese Patent Publication No. H5-68850, wherein item 101 is a generator case in which a bowl shaped front bracket 102, a bowl shaped rear bracket 103 and a cylindrical enclosure 104 are joined together to form divided chambers for housing parts located inside of the case and a coolant chamber located outside of the chamber. The item 107 is a sealing member such as O-ring disposed at the mating portion of the front bracket 102 and the rear bracket 103; item 108 is a gasket arranged at the engagement portion of the front bracket 102 and the enclosure 104; item 109 is a gasket arranged at the engagement portion of the rear bracket 3 and the enclosure 104; item 110 is an inlet opening portion arranged on the bracket 103; item 111 is a cylindrical stator which consists of a stator magnetic pole 112 and the stator coil 113 and is attached to the enclosure 104; item 114 is a generator shaft attached rotatably at the center of the front bracket 102 and of the rear bracket 103 through a front bearing 115 and a rear bearing 116; item 117 is a pulley attached to the generator shaft 114 protruded to the front side from the rear bracket 102 so that it can be rotated being united with the the generator shaft; item 118 is a rotor magnetic pole consisting of a first rotor magnetic pole member 119 engaging attached to the generator shaft 114 enabling rotation united with the generator shaft 114 and of a second rotor magnetic pole member 121 fixed to a periphery of a first rotor magnetic pole 119 through a supporting ring 120; item 122 is a magnetic exciter which consists of an exciting pole member 123 attached to the rear bracket 103 and a exciting coil 124 attached to the magnetic exciting pole member 123 and is accepted in a cylindrical receiving portion 125 formed in the rotor magnetic pole member 118; air gaps are formed between the stator 111 and the rotor magnetic pole member 118 and between the rotor magnetic pole member and the exciter 122, respectively; item 126 is a thermal conducting member and it is provided for emanating heat generated in the magnetic exciter 122 and penetrates the rear bracket 103; item 127 is a sealing material furnished at the portion where the thermal conducting member 126 penetrates the rear bracket 103; item 128 is a plate shaped cooling cover in a form of plate and attached to the rear bracket 103 so that a second cooling chamber 129 is formed between a back surface of the rear bracket and the cooling cover; item 130 is a passage way formed in the rear bracket 103 and connects the first cooling chamber 106 and the second cooling chamber 129; item 131 is a gasket arranged at the engagement portion of the rear bracket 103 and the cooling cover 128; item 132 is a voltage regulator attached to the back surface of the cooling cover 128; item 133 is a terminal of the voltage regulator; item 134 is a rectifier attached to the back surface of the cooling cover 128; item 135 is a terminal of the rectifier; item 136 is a fixed terminal which protrudes outwardly from the enclosure 104 and is connected to the rectifier terminal 135; item 137 is an external terminal provided in the vicinity of the rectifier 134; item 138 is a connecting member of the external terminal 137 connected to the voltage regulator terminal 133; item 140 is a protecting cover and is attached to the rear bracket 103 to overlay the cooling cover 128; the voltage regulator 132, the voltage regulator terminal 133, the rectifier 134, the rectifier terminal 135, the fixed terminal 136, and the connecting member 138; item 141 is a hole formed in the protection cover 140 to allow projection of the external terminal 137 to outside of the protection cover 140; item 142 is a coolant.

First of all, operation of the alternating current generation when a conventional alternating current generator is applied to an automobile will be described. The alternating current generator is mounted outside of a cylinder block of an engine, a loop belt is passed over a pulley mounted on an engine crankshaft and the pulley 117 of the alternating current generator and wirings are provided to the external terminal 137 and to a battery of an automobile. In this condition, when a driver turn on the ignition switch of the automobile electric current flows to the ignition coil from the battery thereby the engine is started and at the same time an exciting current flows to the exciting coil 124 from the battery through the voltage regulator 132 thereby a magnetic circuit is formed by the stator magnetic pole 112, the rotor magnetic pole member 118 and the exciting magnetic pole member 123. Then, by starting the engine as mentioned above, the generator shaft 114 rotates and in turn the rotor magnetic pole member 118 rotates and by this rotation the first rotor magnetic pole member 119 and the second magnetic pole member 121 move across the stator magnetic pole 112 alternatingly, thereby an alternating magnetic flux passes through the stator magnetic coil 113 resulting in a generation of an induced electromotive force of a three phase alternating current on the stator coil 113. After this induced electromotive voltage is regulated by the voltage regulator 132, it is rectified through the rectifier 134 and then the battery is charged by this rectified current supplied from the external terminal 137 through an unshown wiring.

Next, the operation of cooling with a use of a conventional alternating current generator applied to an automobile will be described. The alternating current generator is mounted on an engine, the inlet opening portion 110 and unshown outlet opening portion are connected to a cooling system of an engine. Upon starting the engine, the alternating current generator performs alternating current generation, and a water pump in a cooling system is driven thereby a coolant is circulated. Under this condition, the coolant 142 as shown by the dotted line flows through the first cooling chamber 106, the connecting passageway 130 and the second cooling chamber 129 successively along the direction of arrow X3 from the inlet opening portion 110. Heat generated from the parts such as the stator 111, the magnetic exciter 122, the voltage regulator 132, and the rectifier 134 due to the alternating current generation is absorbed into the coolant 142 through the thermal exchange with the coolant 142. The coolant 142 which has absorbed the heat returns to the engine cooling system from the outlet opening portion. (Cooling system arrangement similar to this cooling system is disclosed by the FIG. 12 of the Laid-Open publication application No. H8-130854.)

The conventional alternating current generator for a vehicle takes a form of construction as mentioned above, the first cooling chamber 106 is formed to be isolated from the parts housing chamber 105 by three separated parts of the front bracket 102, the rear bracket 103 and the cylindrical enclosure 104; and also the second cooling chamber 129 is formed outside the generator case 101 by means of two parts of the rear bracket 103 and the cooling cover 128; thus, the structure of the portion which bears the cooling function by means of the coolant 142 was complicated.

SUMMARY OF THE PRESENT INVENTION

Object of the present is to provide an alternating current generator for vehicles capable of attaining a simplification of the structure of the portion which performs the cooling function.

The alternating current generator for a vehicle according to claim 1 is the one which has a cooling function by means of a coolant, wherein at least one of the front bracket and the rear bracket has an annular recessed portion on a periphery of the respective bracket; the front bracket and the rear bracket are joined together to mate each other so that a parts housing chamber for receiving electric generating parts including a generator shaft, a stator and a rotor is formed and also the annular recessed portion is formed to a peripheral cooling chamber; by attaching a cooling cover to the back side of the rear bracket, the rear bracket and the cooling cover form a rear cooling chamber; and the rear bracket comprises a hole for connecting the peripheral cooling chamber and the rear cooling chamber.

The alternating current generator for a vehicle according to claim 2, wherein the annular cooling recessed portions as recited in claim 1 are formed on both the front bracket and the rear bracket, and the mating faces of the front bracket and the rear bracket are provided at a position corresponding to the stator. An alternating current generator for a vehicle according to claim 3, wherein the mating faces of the front bracket and the rear bracket as recited in claim 1 are formed to an annular stepped portion. An alternating current generator for a vehicle according to claim 4, wherein the electric generating parts fixed to the generator shaft as recited in claim 1 includes a fan. An alternating current generator for a vehicle according to claim 5, wherein the front bracket, the rear bracket and cooling cover as recited in claim 1 consist of a material having a good thermal conduction. An alternating current generator for a vehicle according to claim 6, wherein the stator as recited in claim 1 is supported in a bracket which forms the parts housing chamber through an electric insulating material having a good thermal condition. An alternating current generator for a vehicle according to claim 7, wherein the electric insulating material as recited in claim 6 is filled in and solidified in the gap formed between the stator and the parts housing chamber. An alternating current generator for a vehicle according to claim 8, wherein the front bracket as recited in claim 1 comprises a filling opening in order to fill in and solidify in the electric insulating material. An alternating current generator for a vehicle according to claim 9, wherein the rear bracket as recited in claim 1 comprises a filling opening in order to fill in and to solidify the electric insulating material. An alternating current generator for a vehicle according to claim 10, wherein the voltage regulator is attached to a side surface of the parts housing chamber of the rear bracket as recited in claim 1 through a mat having a good thermal conduction. An alternating current generator for a vehicle according to claim 11, wherein the rectifier is attached to a side surface of the parts housing chamber of the rear bracket as recited in claim 1 through a mat having a good thermal conduction. An alternating current generator for a vehicle according to claim 12, wherein a partition having a good thermal conduction is arranged in the parts housing chamber as recited in claim 1, wherein the partition is provided in the rear bracket. An alternating current generator for a vehicle according to claim 13, wherein the partition as recited in claim 12 are provided with a cooling fins. An alternating current generator for a vehicle according to claim 14, wherein the side surface of the bracket 2, 3, which form the parts housing chamber as recited in claim 1, is provided with cooling fins 15, 16. An alternating current generator for a vehicle according to claim 15, wherein the cooling fins as recited in claim 14 are formed annularly along peripheral direction of the peripheral cooling chamber. An alternating current generator for a vehicle according to claim 16, wherein cooling fins as recited in claim 14 are provided correspondingly to the rectifier attached to the rear bracket. An alternating current generator for a vehicle according to claim 17, wherein cooling fins as recited in claim 14 are provided correspondingly to the voltage regulator attached to the rear bracket. An alternating current generator for a vehicle according to claim 18, wherein the rear cooling chamber as recited in claim 1 is provided with an inflow opening portion for bringing the coolant into the rear cooling chamber and the peripheral cooling chamber as recited in claim 1 is provided with an outflow opening portion for bringing out the coolant from the peripheral cooling chamber.

An alternating current generator for a vehicle according to claim 19, wherein a cooling system, which includes at least a tank and a radiator and is separated from the system for cooling an engine for a vehicle, is connected in the cooling chamber as recited in claim 1.

The above and other objectives, features and advantages of the invention will become more apparent from the following description when taken in conjunction with the accompanying drawings.

DETAILED DESCRIPTION OF THE PREFERRED EMBODIMENTS

Embodiment 1

Figure 1:
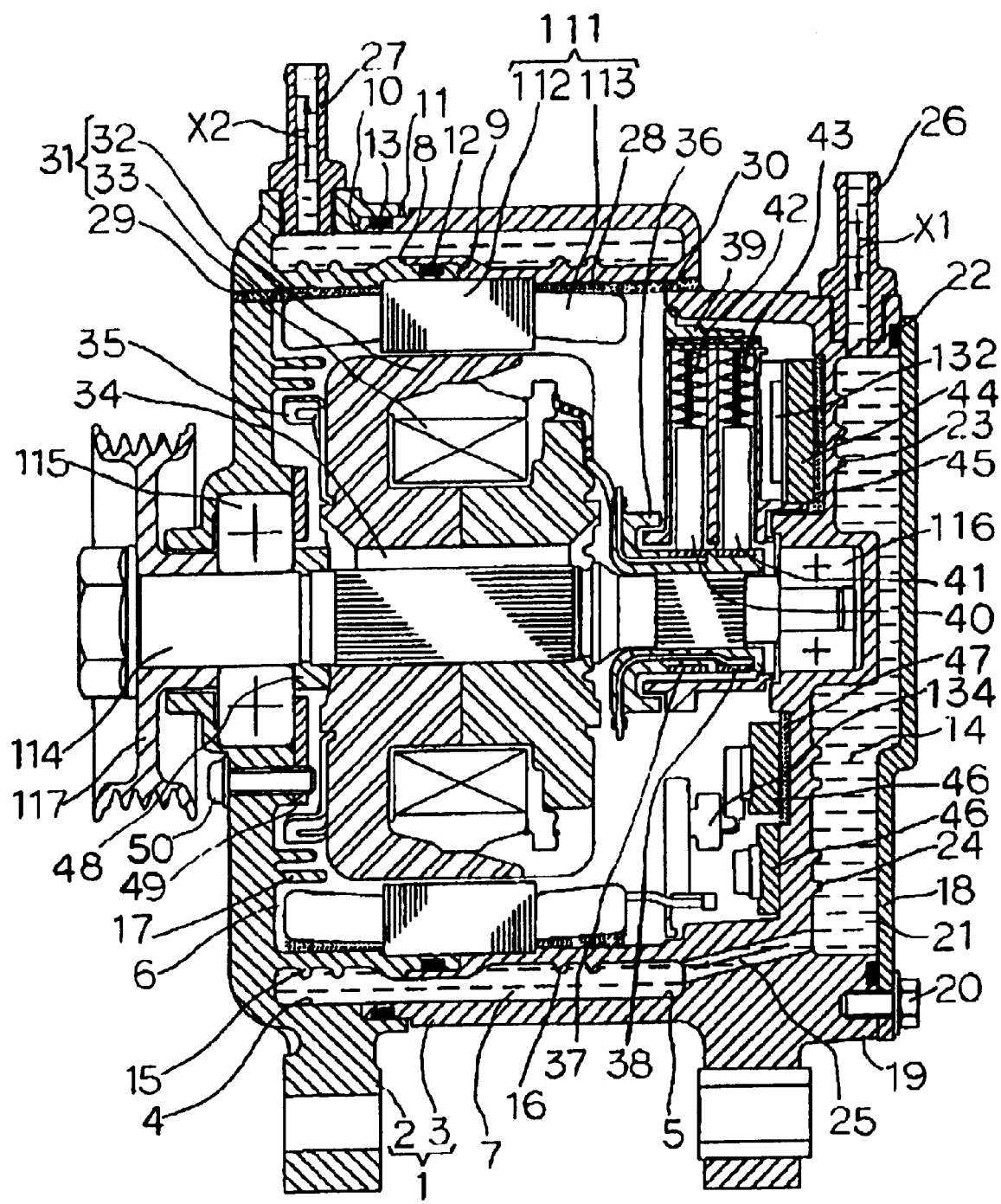
FIG. 1 is a sectional view of an alternating current generator of the Embodiment 1 of the present invention.
Figure 2:
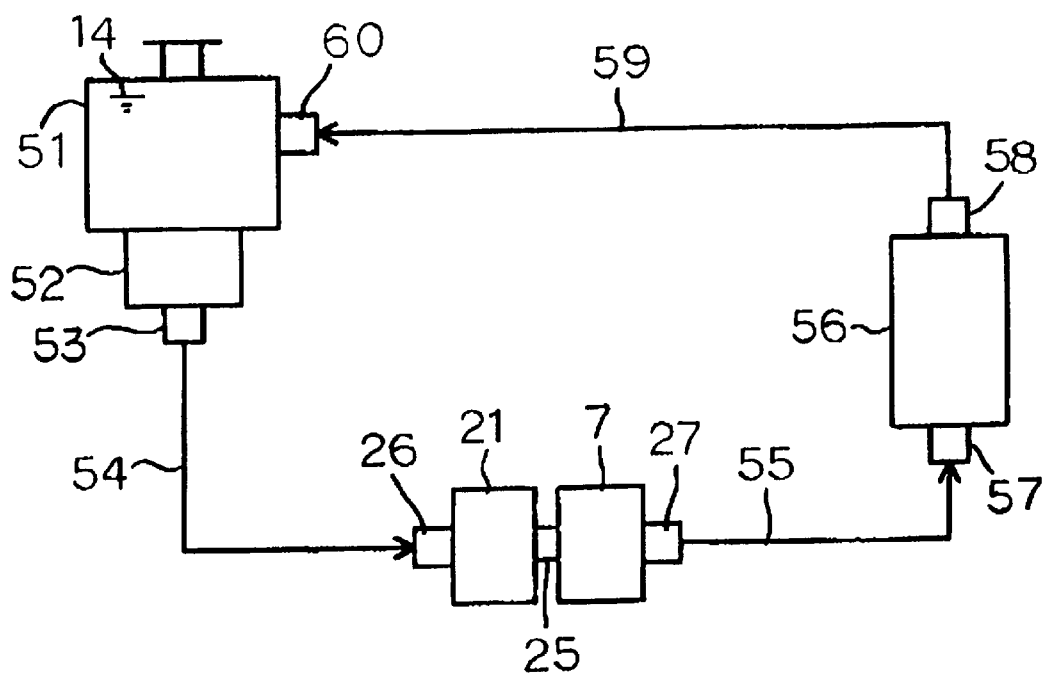
FIG. 2 is a block diagram showing a cooling system of the Embodiment 1 of the present invention.
Figure 3:
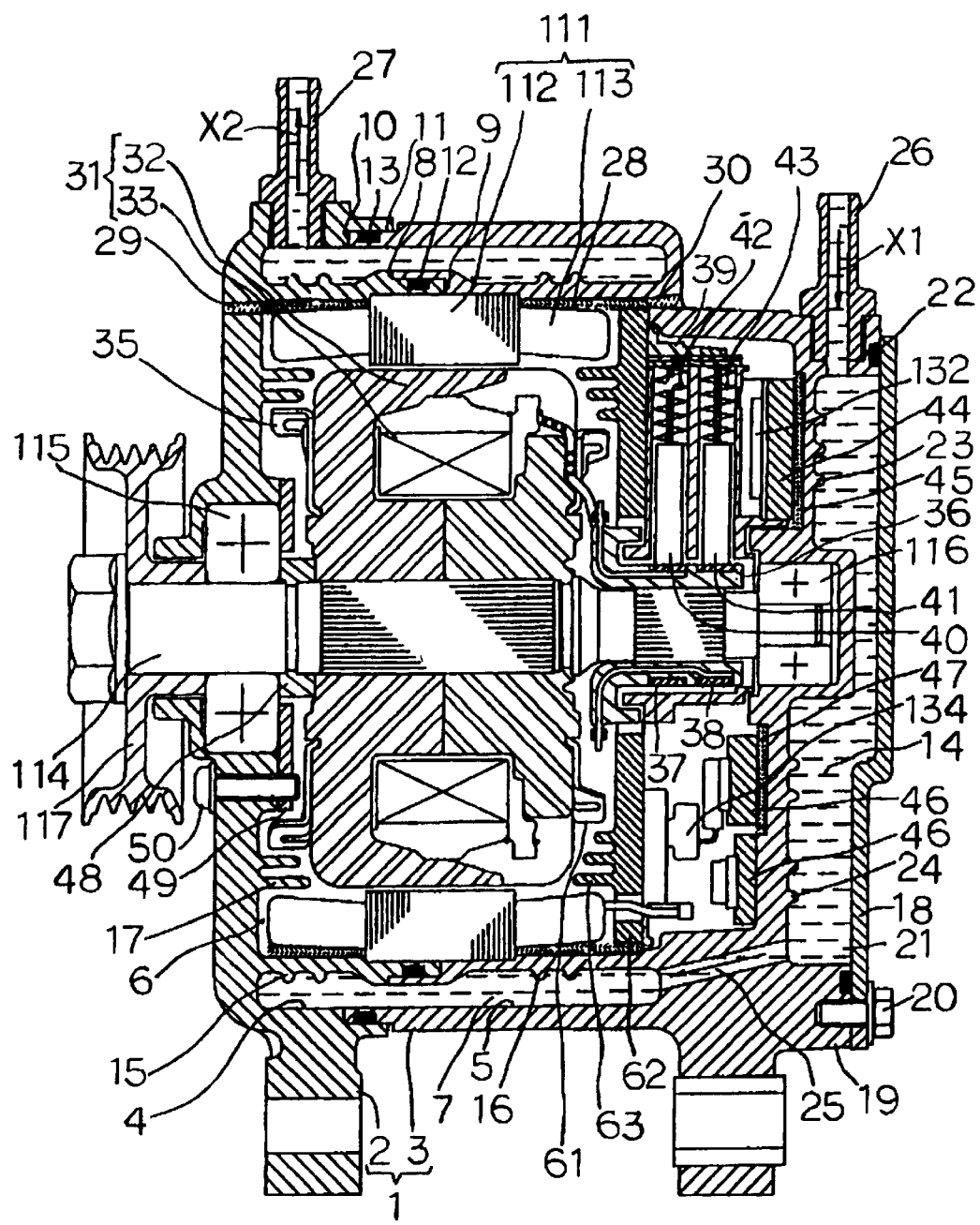
FIG. 3 is a sectional view of an alternating current generator of the Embodiment 2 of the present invention.

From FIG. 1 to FIG. 3 show the Embodiment 1 of the present invention, and among these figures, FIG. 1 shows a sectional view of a alternating current generation for vehicles with brushes, and FIG. 2 is a block diagram showing a cooling system. In FIG. 1, item 1 is a generator case and a bowl shaped front bracket 2 and a bowl shaped rear bracket 3 have individually respective annular cooling recessed portions 4, 5 on respective peripheral portions. The cooling recessed portion 4 of the front bracket 2 is opened rearwardly, and the cooling recessed portion 5 of the rear bracket 3 is frontwardly opened. The front bracket 2 and the rear bracket 3 are joined to mate each other so that a parts housing chamber 6 is formed and also the cooling recessed portions 4 and 5 form a hermitically sealed peripheral cooling chamber 7. Mating faces 8, 9, 10, 11 of the front bracket 2 and the rear bracket 3 are formed as stepped portion. Inner mating faces 8, 9 of front bracket 2 and the rear bracket 3 between the parts housing chamber and the peripheral cooling chamber 7 are set at a position corresponding to the stator 111. Item 12 is an O-ring shaped sealing member disposed between mating faces 8 and 9 and likewise item 13 is an O-ring shaped sealing member disposed between mating faces 10 and 11. Sealing members 12, 13 prevent the coolant from leakage from the peripheral cooling chamber 7 through mated faces from 8 to 11 as shown by the dotted line. Items 15, 16 are cooling fins provided on the surface of peripheral cooling chambers of the front bracket 2 and the rear bracket 3, and those fins are arranged in parallel to the generator shaft 114 being spaced with a predetermined fixed distance, and protrude in a plurality of annular protrusions covering whole periphery of the front bracket 2 and the rear bracket 3. Item 17 are cooling fins provided in the front side surface of the parts housing chamber 6 of the front bracket 2 and protrudes annularly from respective circumferences of circles having different radius centering the generator shaft 114. Cooling fins 15, 17 are moulded together with the front bracket 2 at the time of moulding the front bracket 2 using the same material as that of the front bracket 2 so that those fins 15, 17 and the front bracket 2 are formed to a single body. Likewise, cooling fins 16 are moulded together with the rear bracket 3 at the time of moulding using the same material as that of the rear bracket so that fins 16 and the rear bracket 3 are formed to a single body. A material having a good thermal conduction such as aluminum is used for the front bracket 2, the rear bracket 3 and fins from 15 to 17.

Item 18 is a cooling cover attached to the back side of the rear bracket, and this cooling cover 18 is attached to the annular flange portion 19, which protrudes on the back face of the rear bracket 3, by a bolt consisting of a material such as aluminum having a good thermal conduction so that the rear cooling chamber 21 can be formed with hermetically sealed condition between the bracket 3 and the cooling cover 18. Item 22 is a sealing material such as O-ring disposed between mating faces of rear flange portion 19 and the cooling cover 18 and prevents the coolant 14 of the rear cooling chamber 21 from leakage through the mating face. Item 23 are cooling fins that are arranged correspondingly to the voltage regulator 132 on the side surface of the rear cooling chamber of the rear bracket 3, and item 24 are also cooling fins and are arranged corresponding to the rectifier 134, on the side surface of the cooling chamber of the rear bracket 3. These fins 23 and 24 are moulded together with the rear bracket 3 using the same material as that of the rear bracket 3, so that fins 23, 24 and the rear bracket 3 are formed to a single body. Fins 23, 24 can be arranged to protrude annularly from respective circumferences of circles with different radius centering at the generator shaft 114, but by moulding fins 23, 24 correspondingly to the voltage regulator 132 and to the rectifier 134, respectively, cooling down of the voltage regulator 132 and the rectifier 134 by the coolant 14 will be performed smoothly. Each of rear bracket 3 and fins 23, 24 consists of a material having a good thermal conduction such as aluminum. Item 25 is a connecting hole provided in the rear bracket 3 for connecting the rear cooling chamber 21 to the peripheral cooling chamber 7. Item 26 is an inflow opening portion provided through the rear flange portion 19 for making a connection with the rear cooling chamber 21 and this inflow opening portion is attached to the rear bracket 3 by screwing a screw portion formed on the peripheral surface of the base of the inflow opening portion 26 into a tapped hole formed through the rear flange portion 19. Likewise, item 27 is a outflow opening portion provided through peripheral wall of the front bracket 2 for making a connection with the peripheral cooling chamber 7 and this outflow opening portion is attached to the front bracket 2 by screwing a screw portion formed on the peripheral surface of the base of the outflow opening portion 27 into a tapped hole formed in peripheral wall of the front bracket. As shown by the arrow X1, the coolant 14 is brought into the rear cooling chamber 21 from the inflow opening portion 26. Then the coolant 14 flows into the peripheral cooling chamber 7 from the rear cooling chamber 21 through the connecting hole 25. After that, as shown by the arrow X2, the coolant 14 is brought out from the peripheral cooling chamber 7 through the outflow opening portion 27. Item 28 is an electric insulating material such as silicon resin having a good thermal conduction and this material is, through the filling opening 29 formed through the front bracket 2 and through the filling opening 30 formed through the rear bracket 30, filled in and solidified in the gap enclosed by the front bracket 2, the rear bracket 3 and the stator 111. Therefore, the stator 111 fixed to the front bracket 2 and the rear bracket 3 can be supported more rigidly. Though the electric insulating material 28 is not necessarily required to be filled in and solidified in the filling opening portions 29, 30, the parts housing chamber 6 can be adequately protected against entry of water from outside of the generator case 1 by filling and solidifying the electric insulating material in the filling opening portions 29, 30 too, as shown by those figures.

According to Embodiment 1, the elements such as the stator 111, the generator shaft 114, the front bearing 115, the rear bearing 116, the pulley 117, the voltage regulator 132 and the rectifier 134 are the same as those features disclosed by the prior art reference, nevertheless, following features from ① to ⑧ are, in addition to the foregoings, distinctive from those of prior arts.

① The stator 111 is placed on the inner peripheral surface of the rear bracket 3 within the parts housing chamber 6.

② The rotor 31 consists of the rotor magnetic pole member 32 press fitted to the generator shaft 114 and the magnetic field coil 33 attached to the rotor magnetic pole member 32.

③ The rotor magnetic pole member comprises a through hole 34 penetrating between the front side and the rear side thereof and a fan fixed to the front side thereof.

④ The magnetic field coil 33 is connected to a plurality of slip rings 37, 38 of the slinger portion 36 press fitted to the portion, located between the rotor 31 and the rear bearing 116, of the generator shaft 114, and by means of brush springs 42, 43, respective slip rings 37, 38 contact individually with respective brushes 40, 41 housed in the brush holder 39.

⑤ The voltage regulator 132 is attached to the side surface of the parts housing chamber of the rear bracket 3 with a interposition of a lamination of plate shaped heat sink 44 consisting of a metal having a good thermal conduction such as aluminum and plate shaped thermal conductor 45 consisting of synthetic resin having a good thermal conduction.

⑥ The rectifier 134 is attached to the side surface of the parts housing chamber of the rear bracket 3 with an interposition of lamination of plate shaped heat sink 46 consisting of a metal such as aluminum having a good thermal conduction and plate shaped thermal conductor 47 consisting synthetic resin having a good thermal conduction.

⑦ Item 48 is a spacer fixed to the generator shaft 114 by externally fitting to the generator shaft 114 at a portion located between the front bearing 115 and the rotor magnetic pole member 31.

⑧ Item 49 is an annular bearing stopper having a bore diameter larger than the diameter of the spacer 48 fixed by a bolt 50 to the front bracket 2 on the side of the parts housing chamber 6 so that this spacer prevents the front bearing 115 from moving toward the parts housing chamber 6.

Now, the operation of the alternating current generator having brushes for an automobile is the same as that of the conventional alternating current generator having brushes for an automobile already known publicly. This is to say that the alternating current generator for a vehicle is mounted on outside of an engine block and a loop belt is passed over a pulley fixed to a crank shaft and a pulley 117 of the alternating current generator and wirings are made on unshown external terminal and on a battery for an automobile; under this condition, a driver turns on an ignition switch of an automobile, then at the same time when the engine starts by flowing through of electric current from the battery, an exciting current flow to the magnetic field coil 33 through the brushes 40, 41 and the slip rings 42, 43 from the battery and the rotor magnetic pole member 32 and the stator magnetic pole 112 form a magnetic circuit; by engine starting as mentioned above, the generator shaft 114 rotates and in turn the rotor 31 rotates and an alternating magnetic flux passes through the stator coil 113 due to the alternating traverse of the rotor magnetic pole member 32 across the stator magnetic pole member 112 and thus these phase alternating electric motive force is induced through the stator coil 113; this induced voltage is rectified by the rectifier 134 after the voltage regulation by the voltage regulator 132 and charges the battery through unshown wiring.

In FIG. 2, item 51 is a tank for storing the coolant 14, item 52 is a pump for sending the coolant stored in the tank 51, item 53 is outlet opening portion of the pump 52, item 54 is a piping for connecting the outlet opening portion 53 and the inflow opening portion of the rear cooling chamber 21, item 55 is a piping for connecting the outflow portion 27 of the peripheral cooling chamber 7 and the inlet portion 57 of the radiator 56, item 59 is a piping for connecting the outlet portion 58 of the radiator 56 to the return opening portion 60 of the tank 51. Thus under the condition that the coolant 14 is filled in the tank 51, by driving pump 52 driven either by means of the electric motor by the power supplied from the battery or by the belt driven by the engine, the coolant 14 returns to the tank 51 starting from this tank 51 through the pump 52, the outlet opening portion 53, the piping 54, the inflow opening portion 26, the rear cooling chamber 21, the connecting hole 25, the peripheral cooling chamber 7, outflow opening portion 27, the piping 55, the inlet opening portion 57, the radiator 56, the outlet opening portion 58, the piping 59 and the return opening portion 60. On the way of performing the circulation of the coolant 14, in the rear cooling chamber 21, by thermal exchange the coolant 14 absorbs heat generated from the parts such as the voltage regulator 132 and the rectifier 134 due to the operation of the alternating current generation, and after that in the peripheral cooling chamber 7, by thermal exchange the coolant 14 absorbs heat from the parts such as the stator 111, the rotor magnetic pole member 32 and the magnetic field coil 33 generated by the operation of the alternating current generator; thus warmed up coolant 14 emanates heat through a thermal exchange through the radiator 56, and is cooled down.

According to the structure of Embodiment 1, since the peripheral cooling chamber 7 is formed in the periphery of the generator case 1 in the form of being isolated from the parts housing chamber 6 by using separated two parts of the front bracket 2 having the annular recessed cooling chamber 4 and the rear bracket 3 having the annular recessed cooling chamber 5, the structure of the peripheral cooling chamber 7 is simple; likewise since the rear cooling chamber 21 is formed in the rear side of the generator case 1 in the form of being isolated from the parts housing chamber 6 by using separated two parts of the rear bracket 3 and the cooling chamber 18, the structure of the rear cooling chamber 21 is simple; thus, the portion which bears the cooling function by means of coolant 14 can be arranged in a simplified structure. Also according to the structure of Embodiment 1, since the cooling recessed portion 4 is formed to open frontward and the cooling recessed portion 5 is opened rearward, when the cooling recessed portion 4 is formed in the front bracket 2 together with the moulding of the front bracket 2 and likewise when the cooling recessed portion 5 is formed in the rear bracket 3 together with the moulding of the rear bracket 5, pattern drawings from the forming block of the front bracket 2 and from that of the rear bracket 3 can be easily carried out.

According to the structure of Embodiment 1, since the cooling cover 18 is attached to the rear bracket 3 by means of the bolt 20 consisting of a material having a good thermal conduction, the thermal transfer between the rear bracket 3 and the cooling cover 18 can be carried out smoothly, thereby cooling performance of the coolant 14 can be improved further.

Also according to the structure of Embodiment 1, since the generator case 1 is formed using a material having a good thermal conduction, the heat generated from the parts such as the stator 111 and the rotor 31 stored in the parts housing chamber 6 is emanated into the coolant 14 in the peripheral cooling chamber 7 through the generator case 1, thereby cooling performance by the coolant 14 flowing through inside of the peripheral cooling chamber 7 can be improved.

Also according to the structure of Embodiment 1, since the rear bracket 3 is formed using a material having a good thermal conduction, heat generated from the parts such as the voltage regulator 132 and the rectifier 134 arranged in the rear bracket 3 can be efficiently emanated into the coolant 14 flowing inside of the rear cooling chamber 21 through the rear bracket 3.

Also according to the structure of Embodiment 1, since the rotor magnetic pole member 32 has the fan 35, during the rotation of the rotor 31, the fan 35 stirs up the air within the parts housing chamber 6 and thus the generator parts such as the rotor 31, the stator 111, the voltage regulator 132 and the rectifier 134 can be cooled down efficiently.

Also according to the structure of Embodiment 1, since the rotor magnetic pole member 32 comprises the through hole 34, air around the rotor 31 circulates in front and rear of the rotor 31 and thus the generator parts within the parts housing chamber 6 can be cooled down efficiently.

Also according to the structure of Embodiment 1, since the stator 111 is supported in the front bracket 2 and the rear bracket 3 through an electric insulator having a good thermal conduction, heat generated from the stator 111 can be emanated into the peripheral cooling chamber 7 efficiently through the front bracket 2 and the rear bracket 3.

Also according to the structure of Embodiment 1, since the cooling fins 15, 16 are formed in the cooling recessed portion 4 of the front bracket 2 and the cooling recessed portion 5 of the rear bracket 3, heat generated from the stator 111 can be emanated efficiently into the coolant 14 flowing through inside of the peripheral cooling chamber 17 through fins 15 and 16 of the front bracket 2 and the rear bracket 3, respectively.

Also according to the structure of Embodiment 1, since the fins 15 and 16 are formed annularly extending along peripheral direction of the front bracket 2 and the rear bracket 3, in the peripheral cooling chamber 7 those fins 15 and 16 act as a guide to make up stream of the coolant 14 from the connecting hole 25 to the outflow opening portion 27, and thus the coolant 14 flows smoothly from the connecting hole 25 of the peripheral cooling chamber 7 to the outflow opening portion 27, thereby thermal exchange through the coolant 14 can be improved.

Also according to the structure of Embodiment 1, since the fin 23 and the fin 24 are provided correspondingly to the voltage regulator 132 and the rectifier 134, respectively and also those fins 23 and 24 are provided on a side surface of the rear cooling chamber of the rear bracket 3, heat generated from the voltage regulator 132 and the rectifier 134 can be emanated efficiently into the coolant 14 flowing through inside of the rear cooling chamber 21 through the rear bracket 3 and the cooling fins 23 and 24.

Also according to the structure of Embodiment 1, since the voltage regulator 132 is mounted in the rear bracket 3 with an interposition of a lamination of the heat sink 44 and the thermal conductor 45 having a good thermal conduction, heat generated from the voltage regulator 132 be conducted efficiently to the rear bracket 3.

Also according to the structure of Embodiment 1, since the rectifier 134 is mounted in the rear bracket 3 with an interposition of a lamination of the heat sink 46 and the good thermal conductor 47 having a good thermal conduction, heat generated from the rectifier 134 can conducted efficiently to the rear bracket 3.

Also according to the structure of Embodiment 1, since the mating faces 8, 9, 10, 11 of the front bracket 2 and the rear bracket 3 are formed to stepped portion, pattern drawings from a forming die of the front bracket 2 and the rear bracket 3 can be carried out easily.

Also according to the structure of Embodiment 1, since the inner mating faces 8, 9 of the front bracket 2 and the rear bracket 3 disposed between the parts housing chamber 6 and the peripheral cooling chamber 7 is set at a position corresponding to the stator 111, the stator 111 acts as a sealing member to prevent the coolant 14 coming from the peripheral cooling chamber 7 from leakage, thereby capability of water retention of the peripheral cooling chamber 7 can be improved.

Also according to the structure of Embodiment 1, since in the cooling chamber 10 as shown by FIG. 3 a cooling system consisting at last of the tank 51 and the radiator 56, which is separated from the cooling system for cooling of an engine for an automobile is connected, there arises no mutual effect of cooling operation between those cooling systems resulting in independent cooling operation for each of them, thereby proper cooling functions for both of them can be assured.

Embodiment 2

Though, in Embodiment 1, the fan 35 is provided in front side of the rotor 31, as shown by FIG. 3, the present invention can be applied to a construction such that, in addition to the fan 35, a fan 61 is provided on rear side of the rotor 31 and also a partition 62 consisting of a metal having a good thermal conduction such as aluminum is arranged in the parts housing chamber 6. FIG. 3 is a sectional view of an alternating current generator with brushes related to the Embodiment 2 of the present invention. In FIG. 3, the fan 61 is fixed on the rear face of the rotor magnetic pole member 32 and the partition 62 is placed in the gap formed between the rotor 31 and the brush holder 39, and is fixed to the rear bracket 3 by unshown bolt consisting of a material having a good thermal conduction. This partition 62 has cooling fins 63 on the face located on the side of rotor. Since the rotor 31 has fans 35, 61 on front and rear side, even when through hole 34 (refer to FIG. 1) is eliminated, air within the parts housing chamber 6 can be stirred up effectively. Since the partition 62 provided in the parts housing chamber 6 isolates the electric generating parts having relatively high heat generation value such as the rotor 31 and the stator 111 from the electric generating parts having relatively low heat generation valve such as the voltage regular 132 and the rectifier 134, semiconductor parts which is relatively weak in exposure to heat such as IC provided in the voltage regulator 132 and in the rectifier 134 can be properly protected from the heat emanated into the parts housing chamber 6.

Embodiment 3

Figure 4:
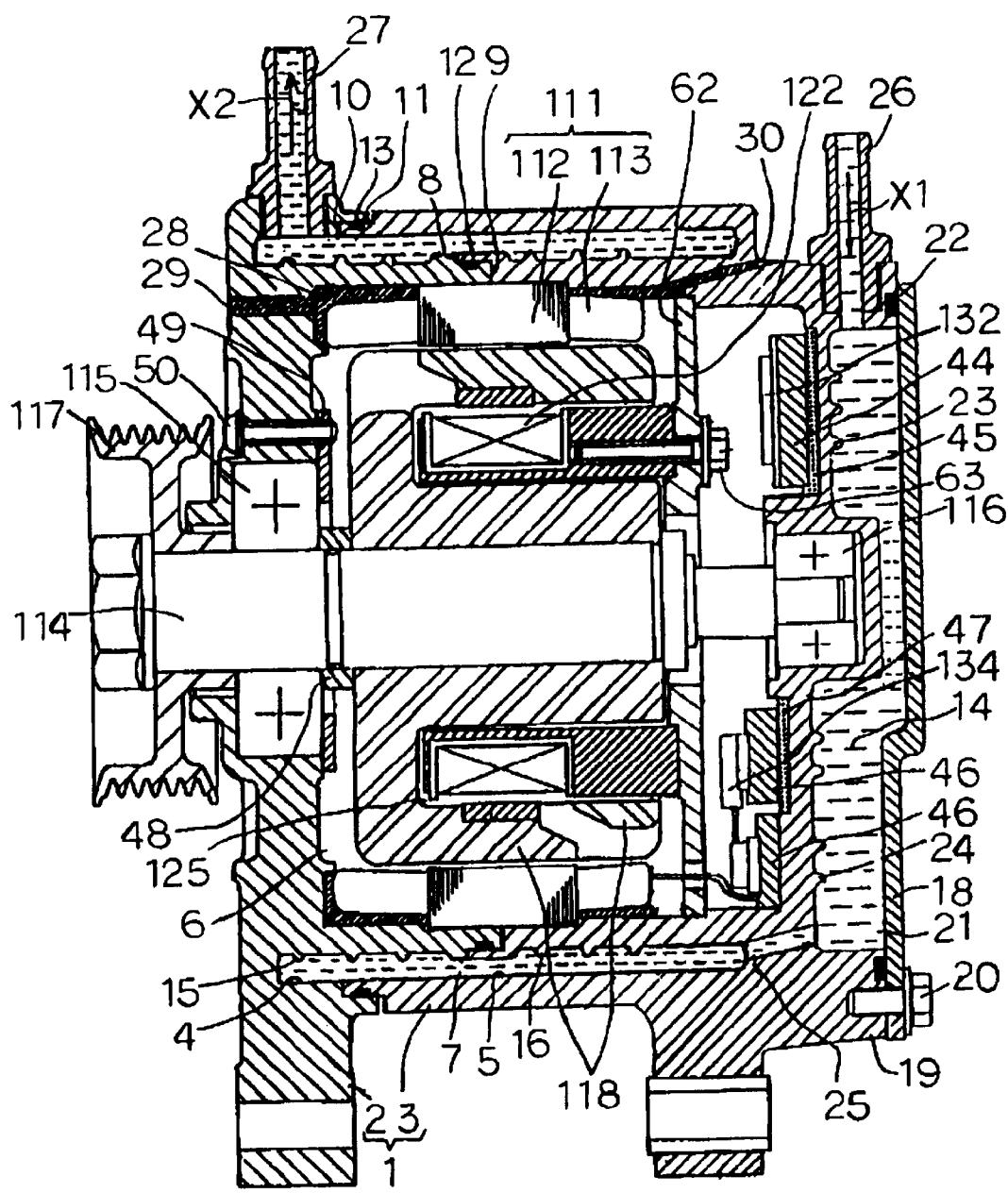
FIG. 4 is a sectional view of an alternating current generator of the Embodiment 3 of the present invention.
Figure 5:
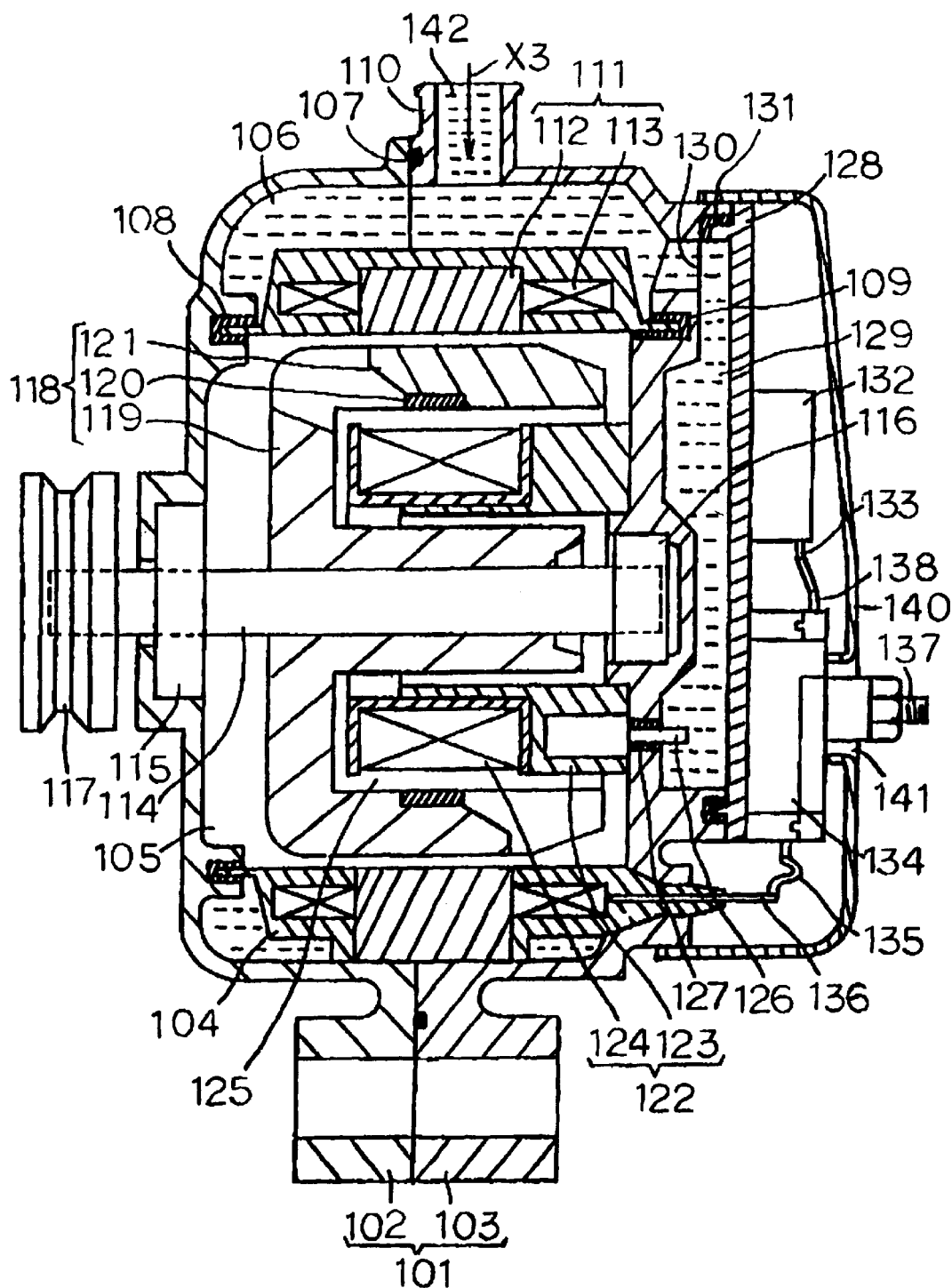
FIG. 5 is a sectional view of a conventional alternating current generator.

Though the generator presented in Embodiment 1 and 2 employs brushes as shown by FIG. 4, the present invention can be applied also to a brushless generator for a vehicle in the same manner. FIG. 4 is a section view showing a brushless generator for a vehicle related to the Embodiment 3. In FIG. 4, generator parts correspond to the forgoing rotor 31 comprises a rotor magnetic pole member 118 which is fixed to a generator shaft 114 and a magnetic exciting member 122 which is fixed to a partition 62 by a bolt 63 consisting of a good thermal conducting material, and furthermore a magnetic exciting member 122 is received in a cylindrical housing 125 formed in the rotor magnetic pole member 118. Accordingly, heat generated from the magnetic exciting member 122 is transferred to the rear bracket 3 through the partition 62 from the bolt 63 thereby the heat emanation can be performed efficiently.

In Embodiment from 1 to 3, a pattern of flow of coolant such that the coolant flows from the rear cooling chamber 21 to the peripheral cooling chamber 7 is employed but conversely it is also possible to choose to flow from the peripheral cooling chamber 7 to the rear cooling chamber 21 by exchanging the position of the inflow opening portion 26 and the outflow opening portion 27; however in this flow pattern, at first the coolant cools down generator parts having high heat generation value such as stator 111, the rotor 31, or the rotor magnetic pole member 118 and the magnetic exciting member 122 and after that cools down the electric generating parts having low heat generation value such as the voltage regulator 132 and the rectifier 134, it is necessary to increase the flow speed of the coolant. Comparing with foregoing, by arranging the coolant to flow from the rear cooling chamber 21 to the peripheral cooling chamber 7 as shown in Embodiments from 1 to 3, at first the coolant cools down the electric generating parts having relatively low heat generation value such as the voltage regulator 132 and the rectifier 134 and after that cools down the generator parts having relatively high heat generating value such as the stator 111, the rotor 31, the rotor magnetic pole member 118 or the magnetic exciting member 122, then without increasing flow speed of the coolant cooling efficiency by the coolant can be improved further. By incorporating a heat pipe into the generator shaft or make a shaft having a structure of heat pipe, heat generated from the rotor 31 and the rotor magnetic pole member 118 can be emanated through the shaft, thereby cooling efficiency of the rotor 31 and the rotor magnetic pole member 118 will be improved. As mentioned above, according to the present invention as recited in claim 1, parts housing chamber and the peripheral cooling chamber are formed by joining the front bracket and the rear bracket together bringing to mate each other; and the rear cooling chamber, which is connected to the peripheral cooling chamber through a connecting hole, is formed by attaching a cooling cover to the rear bracket. Therefore, the peripheral cooling chamber can be formed by two parts of the front bracket and the rear bracket, and likewise the rear cooling chamber can be formed by two parts of the rear bracket and the cooling cover, thereby the portion which bears the cooling function can be implemented by a simple structure. According to the present invention as recited in claim 2, since the peripheral cooling chamber is formed by the cooling recessed portion of the front bracket and that of the rear bracket, and the mating faces of the front bracket and the rear bracket are set correspondingly to the stator, the rotor can participate in improvement of the water retention capability.

According to the present invention as recited in claim 3, since the mating faces of the front bracket and the rear bracket are formed to stepped portion, the front bracket and the rear bracket can be easily formed.

According to the present invention as recited in claim 4, since the electric generating parts fixed to the generator shaft includes a fan, by stirring up the air within the parts housing chamber due to the rotation of the fan during the operation of electric generation, thereby generator parts stored within the parts housing chamber can be cooled down efficiently.

According to the present invention as recited in claim 5, since the front bracket, the rear bracket and the cooling cover are formed with a material having a good thermal conduction, heat generated from the generator parts stored in the parts housing chamber can be emanated outside the generator efficiently by a thermal transfer through a material having a good thermal conduction, thereby the generator parts are properly cooled down entailing a long spanned service life.

According to the present invention as recited in claim 6, since the stator is supported in the bracket forming the parts housing chamber through an electric insulating material having a good thermal condition, heat generated from the stator can be carried into the coolant efficiently through the electric insulating material and the bracket.

According to the present invention as recited in claim 7, since an electric insulating material having a good thermal conduction filled in and solidified in the gap between the stator and the parts housing chamber, comparing with the structure where a rigid electric insulating material is provided in the gap being sandwiched between the stator and the parts housing chamber, the insulating material permeates into the gap thoroughly, thereby the insulating material can covey the heat generated from the stator to the bracket efficiently.

According to the present invention as recited in claim 8, since an electric insulating material having a good thermal conduction is filled in and solidified in the gap formed between the parts housing chamber and the stator from the filling opening portion formed in the front bracket, filling operation of the electrical insulating material can be carried out easily and also heat generated from the stator can be transferred to the bracket efficiently.

According to the present invention as recited in claim 9, since an electric insulating material having a good thermal conduction is filled in and solidified in the gap formed between the parts housing chamber and the stator from the filling opening portion formed in the rear bracket, filling operation of the electrical insulating material can be carried out easily and also heat generated from the stator can be transferred to the bracket efficiently.

According to the present invention as recited in claim 10, since the voltage regulator is attached to the side surface of the parts housing chamber of the rear bracket through a mat having a good thermal conduction, heat generated from the voltage regulator can be carried into the coolant of the rear cooling chamber efficiently through the mat and the bracket.

According to the present invention as recited in claim 11, since the rectifier is attached to the side surface of the parts housing chamber of the rear bracket through a mat having a good thermal conduction, heat generated from the rectifier can be carried into the coolant of the rear cooling chamber efficiently through the mat and the bracket.

According to the present invention as recited in claim 12, since the partition having a good thermal conduction arranged in the parts housing chamber is provided in the rear bracket, the electric generating parts having relatively high heat generation value such as the rotor and stator and the electric generating parts having relatively low heat generating value such as the voltage regular and the rectifier can be isolated each other, thus semiconductor parts contained in the voltage regulator and the rectifier such as IC which are relatively weak in exposure to heat can be protected properly from heat emanated from the rotor and the stator to the parts housing chamber.

According to the present invention as recited in claim 13, the partition is provided with cooling fins and those fins convey heat generated from the electric generating parts stored in the parts housing chamber to the partition efficiently.

According to the present invention as recited in claim 14, since the side surface of the bracket forming the parts housing chamber is provided with cooling fins, the thermal exchange between the bracket and the coolant can be efficiently carried out.

According to the present invention as recited in claim 15, since the cooling fins are formed annularly along the periphery of the peripheral cooling chamber, the cooling fins guide the flow of the coolant to a predetermined direction and thus the guided flow of the coolant improves the thermal exchange capability of the coolant.

According to the present invention as recited in claim 16, cooling fins are provided corresponding to the rectifier arranged in the rear bracket, heat generated from the rectifier can be emanated into the coolant of the rear cooling chamber efficiently through the rear bracket and the cooling fins.

According to the present invention as recited in claim 17, cooling fins are provided correspondingly to the voltage regulator arranged in the rear bracket, heat generated from the voltage regulator can be emanated into the coolant of the rear cooling chamber efficiently through the rear bracket and the cooling fins.

According to the present invention as recited in claim 18, since the inflow opening portion is provided in the rear cooling chamber and also the outflow opening portion is provided in the peripheral cooling chamber, at first the generator parts having relatively low heat generating value is cooled down and after that the generator parts having relatively high heat generating value is cooled down resulting in improvement of cooling efficiency by coolant.

According to the present invention as recited in claim 19, since in the cooling chamber a cooling system comprising at least a tank and a radiator which are separated from the cooling system for cooling engine is connected, cooling operation of generator and that of engine become to be independent of each other and both of coolings can be carried out properly. Further, since cooling system of the generator comprises at least a tank and a radiator, it is possible to make an arrangement to utilize the tank for supplement of the coolant, thus for example when installing an alternating current generator in an automobile, even in the case where it is performed within narrow engine room with a coexistence with automobile parts associated with elements other than the generator, the tank can be placed at an optimum position so that in turn the radiator can be placed at an optimum position for heat emanation.

What is claimed is:

1. An alternating current generator for a vehicle said generator comprising:

a front bracket and a rear bracket coupled together, at least one of said front bracket and said rear bracket having a recessed portion that forms a peripheral cooling chamber for accommodating a fluid;

said front bracket and said rear bracket forming a parts housing chamber for receiving a generator shaft, a stator, and a rotor;

a cooling cover attached to said rear bracket to form a rear cooling chamber for accommodating said fluid; and a connecting hole provided through said rear bracket for connecting said peripheral cooling chamber to said rear cooling chamber, wherein said parts housing chamber is isolated from said peripheral cooling chamber and said rear cooling chamber so as not to accommodate said fluid.

2. An alternating current generator for a vehicle according to claim 1, wherein said front bracket and said rear bracket have recessed portions that cooperate to form said peripheral cooling chamber, and wherein said stator is positioned at a seam between said front bracket and said rear bracket.

3. An alternating current generator for a vehicle according to claim 1, wherein said front bracket and said rear bracket have complementary shaped stepped portions that are abutted together.

4. An alternating current generator for a vehicle according to claim 1, further comprising:

a fan provided in said parts housing chamber.

5. An alternating current generator for a vehicle according to claim 1, wherein said front bracket, said rear bracket and said cooling cover are fabricated from aluminum.

6. An alternating current generator for a vehicle according to claim 1, wherein said stator is supported by an electric insulating material provided in said parts housing chamber.

7. An alternating current generator for a vehicle according to claim 6, wherein said electric insulating material is filled in and solidified in a gap formed between said stator and said parts housing chamber.

8. An alternating current generator for a vehicle according to claim 6, further comprising:

a filling opening portion provided in front bracket through which said electric insulating material enters into said parts housing chamber.

9. An alternating current generator for a vehicle according to claim 6, further comprising:

a filling opening portion provided in said rear bracket through which said electric insulating material enters into said parts housing chamber.

10. An alternating current generator for a vehicle according to claim 1, further comprising:

a voltage regulator provided in said parts housing chamber through a mat.

11. An alternating current generator for a vehicle according to claim 1, further comprising:

a rectifier provided in said parts housing chamber through a mat.

12. An alternating current generator for a vehicle according to claim 1, further comprising:

a partition arranged in said parts housing chamber, and attached to said rear bracket.

13. An alternating current generator for a vehicle according to claim 12, wherein said partition is provided with cooling fins.

14. An alternating current generator for a vehicle according to claim 1, wherein walls of said front bracket and said rear bracket that form said peripheral cooling chamber and said parts housing chamber are provided with cooling fins.

15. An alternating current generator for a vehicle according to claim 14, wherein said cooling fins project into said peripheral cooling chamber.

16. An alternating current generator for a vehicle according to claim 14, further comprising:

a rectifier attached to said rear bracket and located inside said parts housing chamber; and cooling fins projecting into said rear cooling chamber from said rear bracket, said cooling fins located at a position corresponding to said rectifier.

17. An alternating current generator for a vehicle according to claim 14, further comprising:

a voltage regulator attached to said rear bracket and located inside said parts housing chamber; and cooling fins projecting into said rear cooling chamber from said rear bracket, said cooling fins located at a position corresponding to said voltage regulator.

18. An alternating current generator for a vehicle according to claim 1, wherein said rear cooling chamber is provided with an inflow opening portion for flowing said fluid into said rear cooling chamber, and said peripheral cooling chamber is provided with an outflow opening portion for flowing said fluid out from said peripheral cooling chamber.

19. An alternating current generator for a vehicle according to claim 1, wherein an engine cooling system is in fluid communication with said peripheral cooling chamber and said rear cooling chamber.

* * * * *